(12) United States Patent
Zhang et al.

(10) Patent No.: US 11,331,895 B2
(45) Date of Patent: May 17, 2022

(54) LAMINATING METHOD AND DEVICE FOR DISPLAY MODULE, DISPLAY MODULE AND ELECTRONIC DEVICE

(71) Applicant: SHENZHEN HITEVISION TECHNOLOGY CO., LTD., Shenzhen (CN)

(72) Inventors: Peiqi Zhang, Shenzhen (CN); Nana Ren, Shenzhen (CN); Hui Zhou, Shenzhen (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/129,097

(22) Filed: Dec. 21, 2020

(65) Prior Publication Data
US 2021/0370658 A1 Dec. 2, 2021

(30) Foreign Application Priority Data
May 27, 2020 (CN) .......................... 202010458500.5

(51) Int. Cl.
*B32B 37/12* (2006.01)
*B32B 37/10* (2006.01)
*G06F 3/041* (2006.01)

(52) U.S. Cl.
CPC ...... *B32B 37/1284* (2013.01); *B32B 37/1018* (2013.01); *B32B 2037/1253* (2013.01); *B32B 2457/208* (2013.01); *G06F 3/041* (2013.01)

(58) Field of Classification Search
CPC .......... B32B 2457/208; B32B 37/1284; G06F 3/0412; G06F 3/041; E06B 3/677; E06B 3/6775
USPC ........................................................ 156/104
See application file for complete search history.

(56) References Cited

U.S. PATENT DOCUMENTS

2021/0365131 A1\* 11/2021 Zhou ................... B32B 37/1018

FOREIGN PATENT DOCUMENTS

| CN | 109656404 A | \* | 4/2019 |
| CN | 109656404 A | | 4/2019 |

\* cited by examiner

*Primary Examiner* — Carson Gross

(57) ABSTRACT

The present disclosure relates to a laminating method and device for a display module, a display module and an electronic device. The laminating method includes steps of: laminating a second panel on a first surface of a first panel, and positioning the second panel relative to the first panel; and coating a bonding adhesive on a side surface of the second panel along an outer circumference of the second panel and curing the bonding adhesive to form a sealing frame adhesive on an outer circumference side of the second panel and the first surface of the first panel, so that the first panel and the second panel are bonded and fixed by the sealing frame adhesive, wherein a gap defined by the sealing frame adhesive, the first panel and the second panel is in a negative pressure state.

9 Claims, 4 Drawing Sheets

LAMINATING METHOD AND DEVICE FOR DISPLAY MODULE, DISPLAY MODULE AND ELECTRONIC DEVICE

CROSS-REFERENCE TO RELATED APPLICATIONS

This application claims priority to Chinese Patent Application No. 202010458500.5, filed on May 27, 2020, which are hereby incorporated by reference in its entirety.

TECHNICAL FIELD

The present disclosure relates to the technical field of displaying, in particular to a laminating method and device for a display module, a display module, and an electronic device.

BACKGROUND

As display products, especially large-size display products, are increasingly used in fields such as education and business, the requirements for display effects and touch effects of the display products are getting higher and higher. In the manufacturing of display products, it is necessary to laminate the display panel to the touch panel or the glass cover, or to laminate the touch panel to the glass cover. There are two common lamination processes in the industry: frame lamination and full lamination.

SUMMARY

In the frame lamination process, a foam is pasted on one surface of the glass cover at the periphery, and then the display panel is placed on the other side of the foam to realize the lamination of the display panel and the glass cover. With such manner, the glass cover, the foam and the display panel are stacked in sequence, and an air gap is formed between the glass cover and the display panel. When the light emitted by the display panel passes through media with different refractive coefficients, the light transmittance becomes less and the energy loss becomes more; further, since water vapor will inevitably be generated in the gap, the contrast and clarity of the display screen will be worse; moreover, in the case that the touch panel is laminated to the display panel, the touch effect will also be affected. In the full lamination process, a liquid optical glue with a refractive index close to that of the glass is coated on an entire surface of the glass cover, and then the display panel is laminated on the glue layer so as to fill the air gap with the liquid optical glue. Such process can greatly reduce the light loss, increase the light transmittance and improve the display effect, but during the lamination process, the liquid glue is squeezed and will inevitably overflow out of the periphery of the glass cover. To ensure the display effect, it is necessary to slowly remove the overflowing glue with manpower in the following production process; moreover, the optical glue with stable performance is expensive, resulting in a high production cost, a complex manufacturing process and a low efficiency.

In view of the above problems, some manufacturers use a frame adhesive instead of the foam in the frame lamination. However, when implementing such method, since the thickness of the bonding adhesive (which is called frame adhesive after being cured) cannot be well controlled, particularly in the lamination of the display panel, it is necessary to press the glass cover and the display panel and the bonding adhesive will inevitably flow during the pressing, the thickness of the formed frame adhesive is not uniform, which leads to unstable touch signal when the user performs a touch operation, thereby reducing the sensitivity of the touch function and the user experience; moreover, during the pressing, it is difficult to control the flow of the bonding adhesive, the problems such as overflowing and lack of the bonding adhesive may occur, and thus the follow-up heavy adhesive removal and replenishment procedures will be required; sometimes, the bonding adhesive may even enter the display area of the display module, causing the failure of the entire display module and thus reducing of the production efficiency of the entire display module.

Based on the above situation, the main objection of the present disclosure is to provide a laminating method and a laminating device for a display module, a display module, and an electronic device to solve problems during and after forming of the display module caused by frame lamination, full lamination and frame adhesive.

In order to achieve the above objection, the technical solutions adopted by the present invention are set forth as below.

A first aspect of the present disclosure provides a laminating method for a display module, the display module comprising a first panel and a second panel, wherein along a thickness direction of the display module, a projection of the second panel is located within a boundary of a projection of the first panel; and the laminating method comprises:

a positioning step: laminating the second panel on a first surface of the first panel, and positioning the second panel relative to the first panel; and an adhesive coating step: coating a bonding adhesive on a side surface of the second panel along an outer circumference of the second panel and curing the bonding adhesive to form a sealing frame adhesive on an outer circumference side of the second panel and the first surface of the first panel, so that the first panel and the second panel are bonded and fixed by the sealing frame adhesive, wherein a gap defined by the sealing frame adhesive, the first panel and the second panel is in a negative pressure state.

Optionally, the adhesive coating step comprises:

a surrounding portion forming step: coating the bonding adhesive on the side surface of the second panel along the outer circumference of the second panel and curing the bonding adhesive to form a surrounding portion on the outer circumference side of the second panel and the first surface of the first panel, so that the first panel and the second panel are bonded and fixed by the surrounding portion; wherein an air extraction port is formed on the surrounding portion, to communicate an inside and an outside of the surrounding portion through the air extraction port;

a vacuumizing step: vacuumizing the inside of the surrounding portion through the air extraction port; and a blocking step: applying a blocking adhesive to the air extraction port and curing the blocking adhesive to form a blocking portion, so that an internal gap defined by the surrounding portion, the blocking portion, the second panel and the first panel is in a negative pressure state.

Optionally, the surrounding portion forming step specifically comprises steps of:

placing a suction nozzle on the outer circumference side of the second panel; and coating the bonding adhesive on the side surface of the second panel along the outer circumference of the second panel and curing the bonding adhesive to form the surrounding portion on the outer circumference side of the second panel and the first surface of the first panel, so that the first panel and the second panel are bonded and fixed by the surrounding portion, and the air extraction port is formed at the suction nozzle;

wherein the laminating method further comprises the following step between the vacuumizing step and the blocking step: taking out the suction nozzle.

Optionally, a viscosity of the bonding adhesive is 30000 to 100000 mPa·s, and a hardness of the bonding adhesive is 20 to 50 A; and a shearing force of the sealing frame adhesive is greater than or equal to four times a total weight of the first panel, the second panel and the sealing frame adhesive.

Optionally, a thickness of the sealing frame adhesive is greater than or equal to one-half of a thickness of the second panel, and is not greater than a thickness of the second panel; and a width of the sealing frame adhesive is 5 to 20 mm.

Optionally, a pressure in the gap is 0.1 to 3000 Pa.

A second aspect of the present disclosure provides a laminating device for a display module, the laminating device comprises:

a support table, for placing a first panel and a second panel of the display module, so that the second panel is laminated on a first surface of the first panel and positioned relative to the first panel;

an adhesive coating mechanism, having a moving trajectory along a circumferential direction of the support table for coating a bonding adhesive on a side surface of the second panel along an outer circumference of the second panel, so as to form a sealing frame adhesive on an outer circumference side of the second panel and the first surface of the first panel; and a curing mechanism, for curing the bonding adhesive so as to bond and fix the first panel and the second panel through the sealing frame adhesive, wherein both of the adhesive coating mechanism and the curing mechanism are connected to the support table.

A third aspect of the present disclosure provides a display module, comprising a first panel and a second panel, wherein the first panel and the second panel are laminated with each other in a direct contact manner, and along a thickness direction of the display module, a projection of the second panel is located within a boundary of a projection of the first panel;

the display module further comprises a sealing frame adhesive, which is arranged to surround the second panel on a side surface of the second panel and a first surface of the first panel along an outer circumference of the second panel, the first panel and the second panel is bonded and fixed by the sealing frame adhesive, and a gap defined by the sealing frame adhesive, the first panel and the second panel is in a negative pressure state.

Optionally, the sealing frame adhesive comprises a surrounding portion and a blocking portion, the surrounding portion is arranged to surround the second panel at the side surface of the second panel along the outer circumference of the second panel and comprises an air extraction port for vacuumizing the gap through the air extraction port, and the blocking portion is adapted to block off the air extraction port.

A fourth aspect of the present disclosure provides an electronic device, comprising the display module according to any of the above embodiments, wherein the electronic device is an interactive display screen, an interactive smart tablet or a flat-screen TV.

BRIEF DESCRIPTION OF THE DRAWINGS

The preferred embodiments provided by the present disclosure will be described below with reference to the accompanying drawings. In the accompanying drawings.

In the accompanying drawings:
10. first panel;
20. second panel;
30. sealing frame adhesive; 31. surrounding portion; 311. air extraction port; 32. blocking portion.

DETAILED DESCRIPTION

The present disclosure will be described below based on embodiments, but the present disclosure is not limited to these embodiments. In the following detailed description of the present disclosure, some specific details are described in detail. In order to avoid obscuring the essence of the present disclosure, the well-known methods, processes, procedures, and components are not described in detail.

Further, the person skilled in the art should understand that the accompanying drawings provided herein are for illustrative purposes, and the accompanying drawings are not necessarily drawn to scale.

Unless clearly specified in the context, the words "include", "comprise" and other similar words in the entire specification and claims should be interpreted as inclusive rather than exclusive or exhaustive; in other words, these words mean "including but not limited to".

In the description of the present disclosure, it should be understood that the terms "first", "second", etc. are only used for illustrative purposes, and cannot be understood as indicating or implying relative importance. Further, in the description of the present disclosure, unless otherwise specified, "plurality" means two or more.

Figure 2:
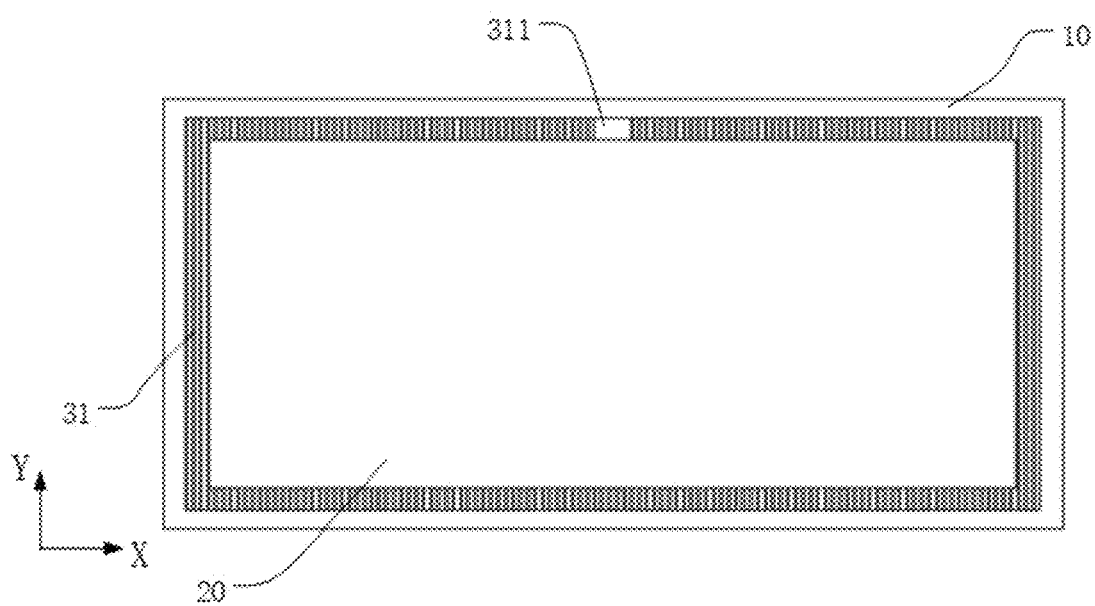
FIG. 2 is a schematic structural diagram of the first panel, the second panel and the surrounding portion after the bonding adhesive is coated in the laminating method provided by the present disclosure.
Figure 3:
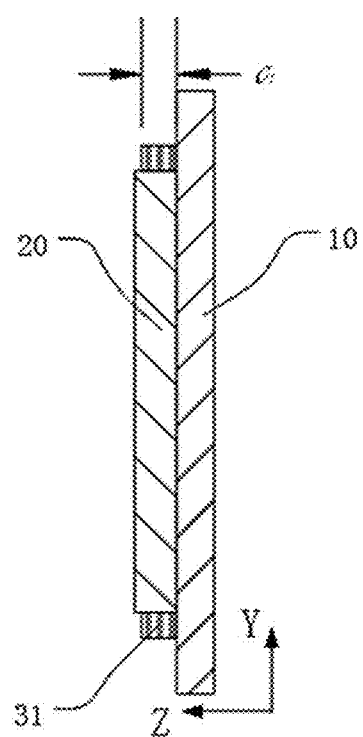
FIG. 3 is a cross-sectional view of the embodiment shown in FIG. 2.
Figure 4:
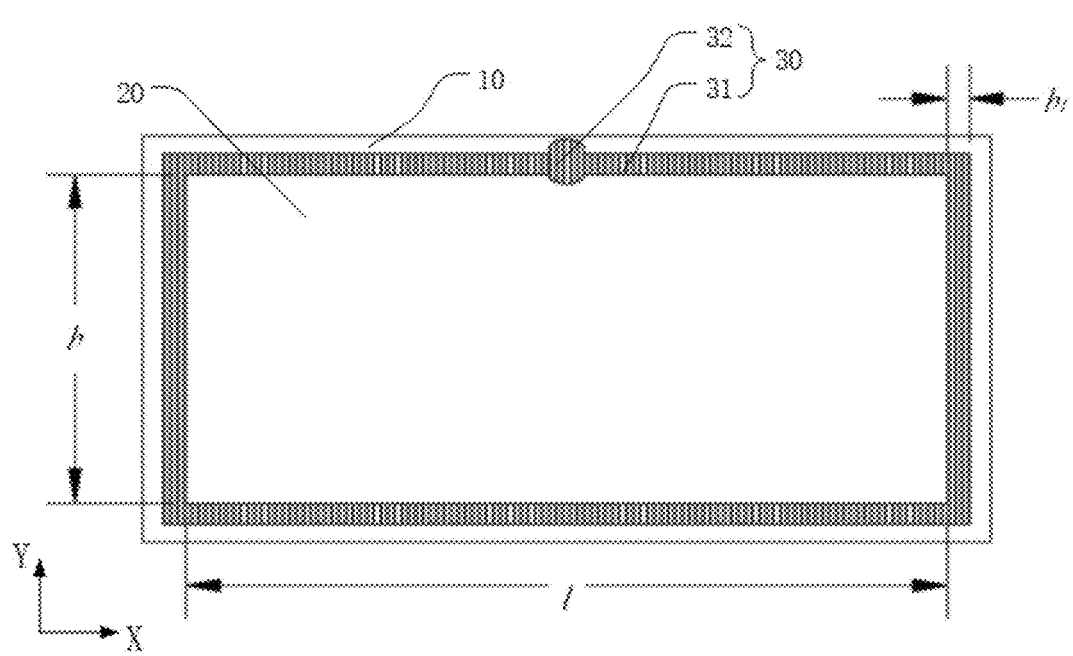
FIG. 4 is a schematic structural diagram of a preferred embodiment of the display module provided by the present disclosure.

For convenience of description, a XYZ rectangular coordinate system is established. Referring to FIGS. 2-4, the length direction of the second panel is taken as the X direction, the width direction of the second panel is taken as the Y direction, and the thickness direction (that is, the thickness direction of the display module) is taken as the Z direction.

The existing electronic device includes a display module. In one case, the display module includes a glass panel, a touch panel, and a display panel, wherein the glass panel is connected to the touch panel, and the touch panel is connected to the display panel; in another case, the display module includes a glass panel and a touch display panel connected to each other, and the touch display panel includes a touch layer and a display layer; in an embodiment of a non-touch device, the display module includes a glass panel and a display panel connected to each other. For convenience of expression, the two panels connected to each other are defined as a first panel and a second panel, respectively.

In order to overcome the problems in the frame lamination and full lamination, in the laminating method of the prior art, the frame adhesive is used instead of the foam in the frame lamination, that is, the bonding adhesive (which forms the frame adhesive after being cured) is coated on one surface of a first panel and then one surface of a second panel is laminated with the first panel via the frame adhesive; in other words, the bonding adhesive is disposed between two surfaces of the first panel and the second panel, and thus a cavity is formed by the first panel, the second panel and the bonding adhesive. However, when implementing this method, the thickness of the bonding adhesive cannot be well controlled when the bonding adhesive is coated on the first panel, especially during the lamination with the second panel, the first panel and the second panel have to be pressed so to be tightly bonded with the frame adhesive, and the frame adhesive will inevitably be squeezed. Therefore, the thickness of the formed frame adhesive is not uniform, which leads to unstable touch signal when the user performs a touch operation, thereby reducing the sensitivity of the touch function and the user experience; moreover, since the surfaces of the first panel and the second panel are relatively smooth, during the pressing, the frame adhesive cannot be blocked by the surface of the first panel and it is difficult to control the flow of the frame adhesive, and thus, the frame adhesive often enter the display area of the display module, resulting in that the adhesive needs to be removed and recoated, and even that the entire display module fails.

Figure 1:
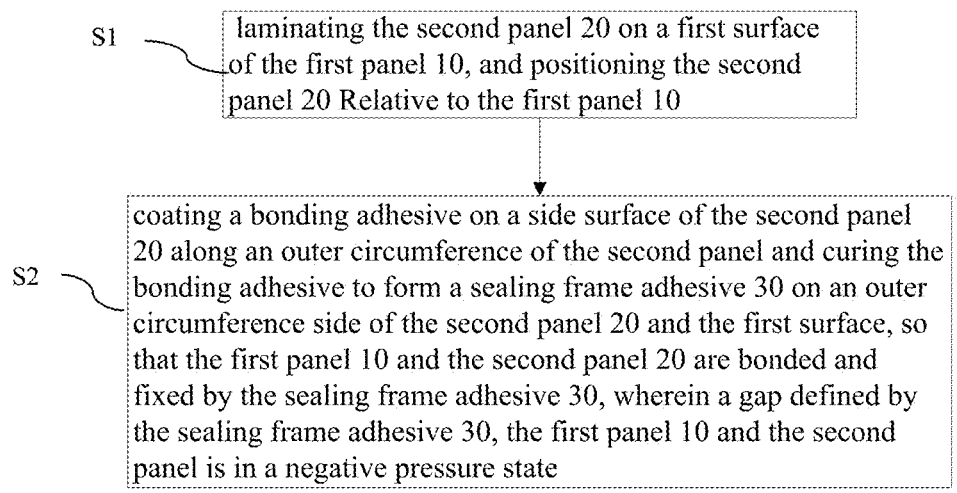
FIG. 1 is a flowchart of a preferred embodiment of the laminating method provided by the present disclosure.

In view of the above technical problems, the present disclosure provides a laminating method for a display module as shown in FIG. 1, and the laminating method includes steps of:

a positioning step S1: laminating a second panel 20 on a first surface of a first panel 10 (that is, the surface of the first panel 10 facing the second panel) and positioning the second panel 20 relative to the first panel 10, that is, laminating the second panel 20 with the first panel 10 in position so that the surfaces of the both are in direct contact.

an adhesive coating step S2: coating a bonding adhesive on a side surface of the second panel 20 along an outer circumference and curing the bonding adhesive to form a sealing frame adhesive 30 on an outer circumference side of the second panel 20 and the first surface of the first panel 10, so as to bond and fix the first panel 10 and the second panel 20 by the sealing frame adhesive 30, wherein a gap defined by the sealing frame adhesive 30 with the first panel 10 and the second panel 20 is in a negative pressure state.

In order to better bond the first panel 10 and the second panel 20, optionally, along the thickness direction Z of the display module (referring to FIG. 3), a projection of the second panel 20 is located within a boundary of a projection of the first panel 10.

In the above laminating method, in a first aspect, the first panel 10 and the second panel 20 are laminated with each other directly, and then the bonding adhesive is coated on the side surface of the second panel 20 and the first surface of the first panel 10 so that the second panel 20 is bonded and fixed with the first panel 10, and that the gap defined by the first panel 10, the second panel 20 and the sealing frame adhesive 30 is in the negative pressure state. Obviously, with such laminating method, the second panel 20 is bonded to the first panel 10 from the side surface of the second panel 20 with the bonding adhesive, the two opposite surfaces of the first panel 10 and the second panel 20 are laminated directly, basically without bonding adhesive between them, and there is no need to press the first panel 10 and the second panel 20 during the entire bonding process. Therefore, the gap between the first panel 10 and the second panel 20 is relatively small and is more uniform, which can improve the display effect of the entire display module, and also can improve the stability of touch, the sensitivity of the touch function and the user experience in the case that the second panel 20 is a touch panel. In a second aspect, since the bonding adhesive will not be squeezed during the entire lamination process, the bonding adhesive basically will not be caused to flow and the problem of overflowing or lack of the adhesive will not occur, the thickness and position of the coated adhesive are controllable and bonding the adhesive basically will not flow into the display area of the display module; therefore, there is no need to slowly remove and replenish the adhesive with manpower in the follow-up process, which saves labor cost and can improve the yield and the production efficiency of the display module; even if the bonding adhesive may diffuse between the second panel 20 and the first panel 10, the diffusion depth is very small and the bonding adhesive will not enter the display area of the display module, due to the blocking of the side wall of the second panel 20; moreover, such slight diffusion can further increase the bonding force between the second panel 20 and the first panel 10, thereby improving the reliability of the display module.

In a third aspect, in the above laminating method, the gap defined by the first panel 10, the second panel 20 and the sealing frame adhesive 30 is in the negative pressure state, which can further reduce the influence of the air in the gap on the refraction of light, and better improve the display and touch effect. In a fourth aspect, with such method, since the bonding adhesive is located outside of the display area and no light needs to pass through the bonding adhesive, the bonding adhesive only needs to be an ordinary adhesive and does not need to be the expensive optical adhesive; as can be seen, the laminating method of the present disclosure not only solves the display problem caused by the air between the first panel 10 and the second panel 20 in the frame lamination process, but also solves the problems of expensive glue and difficult removal of the overflowing adhesive in the full lamination process, and meanwhile, the bonding adhesive will not flow into the display area, the cleaning process of the bonding adhesive is eliminated; moreover, since the main part of the bonding adhesive is located outside the second panel 20, the width of a non-display area of the second panel 20 can be made relatively small, which can better adapt to the development trend of narrow bezels in the electronic device.

The gap formed by the sealing frame adhesive 30 with the first panel 10 and the second panel 20 is in the negative pressure state. This can be achieved by implementing the above laminating method directly in a negative pressure environment, or by leaving an air extraction port when sealing the gap between the first panel 10 and the second panel 20 with the sealing frame adhesive 30, and then vacuumizing an inside of the gap and sealing the air extraction port, that is, the above-mentioned adhesive coating step S2 includes:

a surrounding portion forming step S21: coating the bonding adhesive on the side surface of the second panel 20 along the outer circumference of the second panel 20 and curing the bonding adhesive to form a surrounding portion 31 on the outer circumference side of the second panel 20 and the first surface of the first panel 10, so as to bond and fix the first panel 10 and the second panel 20 by the surrounding portion 31, that is, the side surface of the second panel 20 and the first surface of the first panel 10 are bonded by the bonding adhesive; wherein, an air extraction port 311 is formed on the surrounding portion 31 to communicate an inside and an outside of the surrounding portion 31 through the air extraction port 311; as shown in FIGS. 2 and 3, the bonding adhesive is applied to the first surface of the first panel 10 and the side surface of the second panel 20 along the outer circumference of the second panel 20, and after the adhesive is cured, the second panel 20 is bonded with the first panel 10 by the bonding adhesive, wherein the cured bonding adhesive is the surrounding portion 31;

a vacuumizing step S22: vaccumizing the inside of the surrounding portion through the air extraction port 311; and a blocking step S23: applying a blocking adhesive at the air extraction port 311 and curing the blocking adhesive to form a blocking portion 32 so as to block off the air extraction port 311, that is, after being cured, the blocking portion 32 blocks off the air extraction port 311; in this case, the surrounding portion 31 and the blocking portion 32 together form the sealing frame adhesive 30, so that the internal gap defined by the surrounding portion 31, the blocking portion 32, the second panel 20 and the first panel 10 is in a negative pressure state; as shown in FIG. 4, after the air extraction port 311 is blocked off, the gap defined by the first panel 10, the second panel 20 and the sealing frame adhesive 30 is in the negative pressure state.

With such manner, a large negative pressure space is not required, and the entire lamination process can be performed under normal pressure. Obviously, such manner can save the manufacturing cost.

The surrounding portion 31 can be completely disconnected at the air extraction port 311, that is, the surrounding portion 31 includes a disconnection opening in the circumferential direction of the second panel 20, and the disconnection opening is formed as the air extraction port 311. The surrounding portion 31 may be not completely disconnected at the air extraction port 311, that is, the surrounding portion 31 is still continuously formed in the circumferential direction of the second panel 20, but is formed with a notch or a through hole; in the case of the notch, the notch may be formed by a recess on a side of the surrounding portion facing away from the first panel 10; in the case of the through hole, the through hole penetrates through the surrounding portion 31 from an inner side of the surrounding portion 31 to an outer side thereof.

In a preferred embodiment, the above step S21 specifically includes:

S211: placing a suction nozzle on the outer circumference side of the second panel 20; and S212: coating the bonding adhesive on the side surface of the second panel 20 along the outer circumference of the second panel 20 and curing the bonding adhesive to form the surrounding portion 31 on the outer circumference side of the second panel 20 and the first surface 11 so as to bond and fix the first panel 10 and the second panel 20 by the surrounding portion 31, and the air extraction port 311 is formed at the suction nozzle.

In the present embodiment, a further step is included between the steps S22 and S23:

taking out the suction nozzle.

By pre-placing the suction nozzle, the air leakage during the vacuumizing of the inside of the surrounding portion 31 due to lack of tight fit between the suction nozzle and the air extraction opening 311, and thus the lowering of the work efficiency, can be prevented. In fact, when applying the blocking adhesive, the blocking adhesive is substantially fused with the edge of the surrounding portion 31, and when the blocking adhesive is cured, the blocking adhesive can be formed into an integrity with the surrounding portion 31, especially when the same glue is used for the blocking adhesive and the bonding adhesive (described in detail below). As a result, the sealing of the gap defined by the first panel 10, the second panel 20 and the sealing frame adhesive 30 can be better improved.

In an actual operation, in order to further increase the sealing performance to the inside of the surrounding portion 31, the air extraction port 311 may be set to have a relatively small flow area, and thus a needle-type suction nozzle may be selected.

The same glue may be used for the bonding adhesive and the blocking adhesive, and different glues may be used for the both. In order to increase the convenience of the process, it is preferable to use the same glue for the bonding adhesive and the blocking adhesive, so that there is no need to provide two sets of coating mechanism (which are described in detail below) during implementation, or to replace the glue material barrel.

For curing of the bonding adhesive and the blocking adhesive, both of them can be achieved by at least one of heating curing, room temperature curing and UV curing. It is worth noting that the curing manner may be considered when selecting the glue. For example, if the UV curing is used, UV glue is required.

If the fluidity of the bonding adhesive is too large, the bonding adhesive tends to flow after being coated, it is not easy to control the curing position of the bonding adhesive, and there may be more adhesive liquid penetrating between the second panel 20 and the first panel 10, thereby being not conducive to the design trend of narrow bezels and to the control of the shape of the bonding adhesive after being cured; if the fluidity of the bonding adhesive is too poor, break points tend to be generated during coating, which may cause the sealing between the second panel 20 and the first panel 10 to be not tight, and cause the bonding of the adhesive with the second panel 20 and the first panel 10 to be weak, thereby reducing the connection reliability between the second panel 20 and the first panel 10. Considering the above situation, in a preferred embodiment of the present disclosure, the viscosity of the bonding adhesive is 30000 to 100000 mPa·s (the viscosity at a shear rate of 25 per second), such as 30000 mPa·s, 50000 mPa·s, 70000 mPa·s, 90000 mPa·s, and 100000 mPa·s, and the hardness of the bonding adhesive is 20 to 50 A, such as 20 A, 30 A, 35 A, 45 A, and 50 A.

Further, when selecting the bonding adhesive, in order to ensure the connection reliability between the first panel 10 and the second panel 20 after the bonding adhesive is cured (that is, the surrounding portion 31), optionally, the shearing force of the bonding adhesive is greater than or equal to four times the total weight of the first panel 10, the second panel 20 and the sealing frame adhesive 30.

The sealing frame adhesive 30 is formed in an annular shape, and has a cross section in an approximately rectangular shape. In this case, the shear strength P of the sealing frame adhesive 30 satisfies:

$$P \geq \frac{2\{m_{CG} + m_{OC} + \rho[2lb_1c_1 + 2b_1c_1(b-2b_1)]\} \times g}{lb_1 + (b-2b_1)b_1};$$

wherein, as shown in FIGS. 3 and 4, l is the length of the second panel 20 (in the X direction in the figure); b is the width of the second panel 20 (in the Y direction in the figure); $b_1$ is the width of the sealing frame adhesive 30 (that is, the dimension in a direction perpendicular to the thickness direction of the sealing frame adhesive 30 in the cross-section of the sealing frame adhesive 30); $c_1$ is the thickness of the sealing frame adhesive 30 (in the Z direction in the figure); g is the coefficient of gravity; $m_{CG}$ is the mass of the first panel 10; $m_{OC}$ is the mass of the second panel 20; and ρ is the density of the bonding adhesive.

Further, the thickness of the surrounding portion 31 (that is, the dimension in the Z direction) is greater than or equal to one-half of the thickness of the second panel 20, and the thickness of the surrounding portion 31 is not greater than the thickness of the second panel 20, so as to increase the bonding area between the surrounding portion 31 and the side surface of the second panel 20, and to further improve the bonding reliability between the second panel 20 and the first panel 10.

In a preferred embodiment, the width of the sealing frame adhesive 30 (that is, the dimension of a single side of the sealing frame adhesive 30 in the X direction or the Y direction) is 5 to 20 mm, such as 5 mm, 8 mm, 10 mm, 15 mm, and 20 mm. With such setting, not only the bonding area between the sealing frame adhesive 30 and the first panel 10 can be ensured, but also the bonding reliability between the first panel 10 and the second panel 20 can be further improved, without affecting the cooperation of the first panel 10 with other components.

It should be noted that in the case that the cross section of the sealing frame adhesive 30 is in an irregular shape, the thickness of the sealing frame adhesive 30 refers to the maximum dimension in the Z direction, and the width thereof refers to the maximum dimension in the X direction or the Y direction.

It should be understood that due to the relatively small air extraction port, in the above formula, the sealing frame adhesive 30 may be directly replaced by the surrounding portion 31, and the various dimensions of the surrounding portion 31 also may be marked with reference to the dimensions as shown in FIG. 4. Further, although the above formula is given by taking the cross section of the sealing frame adhesive 30 as a rectangle, the present disclosure does not limit the shape of the cross section of the sealing frame adhesive 30 to a rectangle, and the cross section of the sealing frame adhesive 30 may be other regular shapes or irregular shapes. In the case that the cross section of the sealing frame adhesive 30 is in other shapes, only adaptive modifications need to be made according to the above formula.

Considering that the manufacturing process will become more difficult if a too small pressure is required when vacuumizing, in the above step S22, the inside of the surrounding portion 31 is vacuumized through the air extraction port 311 until the internal pressure reaches 0.1 to 3000 Pa. That is to say, after the air extraction port 311 is blocked off, the pressure in the gap formed by the first panel 10, the second panel 20 and the sealing frame adhesive 30 is 0.1 to 3000 Pa, such as 0.1 Pa, 0.5 Pa, 1 Pa, 30 Pa, 100 Pa, 1000 Pa, 2000 Pa, 2500 Pa, and 3000 Pa. With such range of pressure, the process will not be made more difficult, the display effect such as the display clarity of the display module will not be affected, and the sensitivity of touch can be ensured. Specifically, the above-mentioned pressure may be selected according to the characteristics of different first panel, second panel, and the entire display module.

It is worth noting that in the above embodiments, although the viscosity and hardness of the bonding adhesive and the thickness and width of the surrounding portion 31 (or sealing frame adhesive 30) formed by the bonding adhesive are given with the preferred range, and the pressure of the gap is given with a specific range, in other embodiments of the present disclosure, numerical values outside these ranges may be selected.

The present disclosure further provides a laminating device for a display module, which may be adapted to implement the above laminating method. The laminating device includes: a support table, an adhesive coating mechanism, and a curing mechanism. The support table is adapted to place a first panel and a second panel of the display module, and a positioning mechanism may be provided on it to position the two panels when the second panel is laminated on the first panel. The adhesive coating mechanism has a moving trajectory along a circumferential direction of the support table for coating the bonding adhesive on a side surface of the second panel along an outer circumference of the second panel, thereby forming a sealing frame adhesive on an outer circumference side of the second panel and a first surface of the first panel. The curing mechanism is adapted to cure the bonding adhesive and the blocking adhesive, so that the first panel and the second panel are bonded and fixed by the sealing frame adhesive, wherein the above-mentioned adhesive coating mechanism and curing mechanism are both connected to the support table.

The adhesive coating mechanism is further adapted to apply the blocking adhesive at the air extraction port, to block off the air extraction port.

Specifically, a table top of the support table may be selected as a flat plate, or it may be an operating table top commonly used by the person skilled in the art. Apparently, the table top may be provided with grooves or other structures such as auxiliary holes and slots, which will not be described in detail here. The positioning mechanism may be connected to the table top, and may include a magnetic limiting block (in the case that the support table or the first panel includes a magnetic material) or a limiting protrusion. Other positioning structures for a panel commonly used in the field also may be used for positioning.

The adhesive coating mechanism may include a coating device in the prior art. The coating device includes a coating head and a glue barrel, the coating head is communicated with the glue barrel, and a liquid outlet of the coating head may be set as required. Apparently, the coating device further includes other structural parts so as to drive the coating head for coating. The adhesive coating mechanism of the present disclosure further includes a track, the track may be mounted on the support table, and the coating device is slidably disposed on the track, so that the coating device has the above-mentioned moving trajectory along the circumferential direction. The present disclosure does not specifically limit the mating manner between the track and the coating device, and various mating manners in the prior art, such as gear and rack, and slider and chute, may be selected, as long as the coating device can achieve the above-mentioned moving trajectory.

Further, in one embodiment, the laminating device further includes a vacuumizing mechanism for vacuumizing the gap defined by the first panel, the second panel and the sealing frame adhesive.

The curing mechanism includes a heating device or a lighting device to heat or irradiate the bonding adhesive and the blocking adhesive to cure them. Specifically, in the case that the bonding adhesive is cured by heating or cured at room temperature, the curing mechanism may be a device or heating curing or room temperature curing in the prior art, such as a heating assembly. In order to improve the curing efficiency, an incubator may be included, which is kept within a certain temperature range by the heating assembly to facilitate the curing of the adhesive liquid on the object (which is an assembly formed by the first panel, the second panel and the sealing frame adhesive in the present disclosure) located within the incubator. In the case that the bonding adhesive is cured by ultraviolet, the curing device may be an ultraviolet curing device in the prior art, for example, an ultraviolet lamp, and the curing device may further include a containing chamber. By irradiating the object (which is an assembly formed by the first panel, the second panel and the sealing frame adhesive in the present disclosure) located within the containing chamber, the adhesive liquid on the object is cured.

Continuing to refer to FIG. 4, the present disclosure further provides an electronic device that may be used in education, business and other fields, and the electronic device may be a touch device or a non-touch device, such as an interactive display screen, an interactive smart tablet or a flat-screen TV. Specifically, the electronic device includes a display module, the display module includes a first panel 10 and a second panel 20, the first panel 10 and the second panel 20 are laminated with each other in a direct contact manner, and along the thickness direction Z of the display module, a projection of the second panel 20 is located within a boundary of a projection of the first panel 10.

The display module further includes a sealing frame adhesive 30, which is arranged to surround the second panel 20 on a side surface of the second panel 20 and a first surface of the first panel 10 along an outer circumference of the second panel 20, and the second panel 20 and the first panel 10 are bonded and fixed by the sealing frame adhesive 30. That is to say, the sealing frame adhesive is formed in an annular shape, is disposed on an outer side of the second panel 20, and is simultaneously bonded with the first surface of the first panel (that is, the surface of the first panel laminated with the second panel) and the side surface of the second panel, and meanwhile, a gap defined by the sealing frame adhesive 30, the first panel 10 and the second panel 20 is in a negative pressure state.

With reference to the previous description, with the configuration in which the sealing frame adhesive is provided on the side surface of the second panel 20, the first panel 10 and the second panel 20 can be laminated with each other in a direct contact manner, substantially without space between the first panel 10 and the second panel 20. Therefore, the problems of poor display effect and insensitive touch control caused by the nonuniform distance between the first panel 10 and the second panel 20 at various locations can be avoided as much as possible. Meanwhile, considering the limitations of the processing, there will still be tiny gaps between the first panel 10 and the second panel 20 at some locations, and air may be remained in the gap, which will affect the display and touch performance. Therefore, in the present disclosure, the gap is completely sealed by the sealing frame adhesive 30 and vacuumized, so as to improve the display effect, such as clarity, and the sensitivity of touch function.

Specifically, the above-mentioned sealing frame adhesive 30 may be formed as an integrity, that is, is formed by coating and curing for one time (wherein the sealing frame adhesive 30 in the above laminating method is formed by coating and curing twice). In such embodiment, during the lamination process of the display module, the entire display module and the required devices (such as the laminating device as described above) need to be placed in a negative pressure environment.

In a preferred embodiment of the present disclosure, the sealing frame adhesive 30 is formed by the above-mentioned laminating method, that is, the sealing frame adhesive 30 includes a surrounding portion 31 and a blocking portion 32, and the surrounding portion 31 is arranged to surround the second panel 20 on the side surface of the second panel 20 along the outer circumference of the second panel 20, and includes an air extraction port 311 for vacuumizing the above-mentioned gap through the air extraction port 311; then, the blocking portion 32 blocks off the air extraction port 311. The specific forming method and structure of the air extraction port 311 will not be repeated here, and may refer to the description in the above laminating method. With such manner, when laminating the display module, the entire display module does not need to be placed in the negative pressure environment, only the vacuumizing of the gap is needed when necessary.

It should be understood that, the display module includes a display area. Referring to FIG. 4, the maximum distance ($b_1$ as shown in FIG. 4) between the display area and the sealing frame adhesive 30 is 5 to 6 mm, such as 5 mm, 5.1 mm, 5.5 mm, 5.8 mm, 5.9 mm, and 6 mm. As such, it is more conductive for the display module to conform to the development trend of narrow bezels.

In either the embodiments of the above-mentioned laminating method or the embodiments of the display module, the first panel may be a glass cover, and the second panel may be a touch panel or a display touch panel; or, the first panel may be a touch panel, and the second panel may be a display panel. In other words, in the case that the display module includes a glass panel, a touch panel and a display panel, the glass panel is taken as the first panel and the touch panel is taken as the second panel, and the glass panel and the touch panel are laminated and connected with each other at first; then, the touch panel (including the glass panel) is taken as the first panel and the display panel is taken as the second panel, and the touch panel and the display panel are laminated and connected with each other. In the case that the display module includes a glass panel and a touch display panel (the touch display panel includes a touch layer and a display layer) connected with each other, the glass panel is taken as the first panel and the touch display panel is taken as the second panel.

It should be understood that, in a non-touch display module, the display module includes a glass panel and a display panel connected with each other. In this case, a glass panel is taken as the first panel, and the display panel is taken as the second panel.

The person skilled in the art can understand that the above-mentioned preferred embodiments may be freely combined and superimposed on the premise of no conflict.

It should be understood that the above-mentioned embodiments are only exemplary and not restrictive. Without departing from the basic principles of the present disclosure, the person skilled in the art can make various obvious or equivalent modifications or replacements to the above-mentioned details, which also fall within the scope of the claims of the present disclosure.

What is claimed is:

1. A laminating method for a display module, the display module comprising a first panel and a second panel,
wherein along a thickness direction of the display module, a projection of the second panel is located within a boundary of a projection of the first panel; and
the laminating method comprises:
a positioning step: laminating the second panel on a first surface of the first panel, and positioning the second panel relative to the first panel; and
an adhesive coating step: coating a bonding adhesive on a side surface of the second panel along an outer circumference of the second panel and curing the bonding adhesive to form a sealing frame adhesive on an outer circumference side of the second panel and the first surface of the first panel, so that the first panel and the second panel are bonded and fixed by the sealing frame adhesive, wherein a gap defined by the sealing frame adhesive, the first panel and the second panel is in a negative pressure state, wherein the adhesive coating step comprises:

a surrounding portion forming step: coating the bonding adhesive on the side surface of the second panel along the outer circumference of the second panel and curing the bonding adhesive to form a surrounding portion on the outer circumference side of the second panel and the first surface of the first panel, so that the first panel and the second panel are bonded and fixed by the surrounding portion; wherein an air extraction port is formed on the surrounding portion, to communicate an inside and an outside of the surrounding portion through the air extraction port;

a vacuumizing step: vacuumizing the inside of the surrounding portion through the air extraction port; and a blocking step: applying a blocking adhesive to the air extraction port and curing the blocking adhesive to form a blocking portion, so that an internal gap defined by the surrounding portion, the blocking portion, the second panel and the first panel is in a negative pressure state.

2. The laminating method according to claim 1, wherein the surrounding portion forming step specifically comprises steps of:

placing a suction nozzle on the outer circumference side of the second panel; and coating the bonding adhesive on the side surface of the second panel along the outer circumference of the second panel and curing the bonding adhesive to form the surrounding portion on the outer circumference side of the second panel and the first surface of the first panel, so that the first panel and the second panel are bonded and fixed by the surrounding portion, and the air extraction port is formed at the suction nozzle;

wherein the laminating method further comprises the following step between the vacuumizing step and the blocking step: taking out the suction nozzle.

3. The laminating method according to claim 1, wherein a viscosity of the bonding adhesive is 30000 to 100000 mPa·s, and a hardness of the bonding adhesive is 20 to 50 A; and a shearing force of the sealing frame adhesive is greater than or equal to four times a total weight of the first panel, the second panel and the sealing frame adhesive.

4. The laminating method according to claim 1, wherein a thickness of the sealing frame adhesive is greater than or equal to one-half of a thickness of the second panel, and is not greater than a thickness of the second panel; and a width of the sealing frame adhesive is 5 to 20 mm.

5. The laminating method according to claim 1, wherein a pressure in the gap is 0.1 to 3000 Pa.

6. The laminating method according to claim 1, wherein a pressure in the gap is 0.1 to 3000 Pa.

7. The laminating method according to claim 2, wherein a pressure in the gap is 0.1 to 3000 Pa.

8. The laminating method according to claim 3, wherein a pressure in the gap is 0.1 to 3000 Pa.

9. The laminating method according to claim 4, wherein a pressure in the gap is 0.1 to 3000 Pa.

* * * * *